(12) United States Patent
Burdick

(10) Patent No.: X4131
(45) Date of Patent: May 30, 1825

(54) SPINNING, ROPING,WOOL & COTTON

(76) Inventor: Francis Burdick

Francis Burdick of Cortright New York

Letters Patent.

The Schedule referred to in these Letters Patent and making part of the same containing a description in the words of the said Francis Burdick himself of of his improvement in a machine for roping and spinning wool & cotton & rolling This machine consists of a box or chest, on the top edge of the box or chest there may be a gutter or a tongue for a carriage or gripe to run on, on the top of the box near the end is placed in a horizontal position, spindles. and on the point of the spindles is placed a burr. these burrs may be made of metal, wood, or leather: the burrs being fastened on the ends of the spindles. will cause the yarn to keep in its proper place while spinning; or the points of the spindles may be turned one side, or there may be spools in place of spindles with a burr or wires, put in the end of them, to keep the yarn to its place. the threads may be drawn in a right line with the spindles or spools. Near the butt end of the spindles or spools, are placed wheels. and in a right line with the wheels, across the spindles or spools on the side of the box or chest are placed perpendicular arms, rising above the edge of the box or chest- and near the top of these arms runs a spindle. and on this spindle wheels are placed with bands passing from them to the wheels on the spools or spindles. On the end of this spindle outside of the arm, a wheel is placed with a band passing from it to the rim hung on the same side of the machine, or this spindle may be placed under the spools or spindles and pass through the sides of the box or chest. or on the end of the spindle a cog wheel may be placed for a strap running to the rim on the same side of the machine.- This rim is placed on the axle passing through near the centre of the machine, and on the other end of the axle a crank is placed to put the machine in motion. In the box or chest on the axle, two hubs or rollers are placed, one of these hubs or rollers is stationary. in the end of this hub are holes to receive a pin or point which is fastened into the loose hub, and in Francis Burdick — Improvement in the machine for Roping & Spinning Wool & Cotton & Reeling
Patented May 30. 1825

See Vol. 24. p. 1. of [illegible] Patents.

[illegible] signed [illegible] Patent [illegible]
[illegible]
[illegible] Jeremiah [illegible] 15th February 182[illegible].

See p. 3 [illegible]

The [illegible] machine [illegible] is constructed in the following manner.
The wheels [illegible] 2 feet [illegible] inches in diameter are [illegible] in the usual manner
with [illegible] spokes, [illegible] and [illegible], [illegible] except [illegible]
[illegible] of the [illegible] which is of the usual width of rim and [illegible], [illegible] rim
and [illegible] twice the width, and that the [illegible] this latter wheel is provided [illegible]
[illegible] to prevent its [illegible] on the ground.
The wheels run on different axes and both axles are on the same [illegible] line.
[illegible] frame work to connect these wheels together and to support the whole ma-
chinery is constructed in the following manner. A piece of [illegible] inches
[illegible] and six [illegible], which [illegible] distinction may be called [illegible] is [illegible] on its
ends on the axle of the rear wheel close to the hubs at [illegible]. This
axle, immediately under this piece is [illegible], and an iron [illegible] surrounding the
groove is screwed or [illegible] to the plank No. 1. on each side of the groove so that this axle,
which is permanent in the [illegible] can revolve in the groove. No 2. is another piece of plank
of equal dimensions; it extends diagonally from the [illegible] end of No. 1. to which it is
[illegible] to the axle of the [illegible] close to the hub where it is [illegible] to No. _ . No 3. is a
plank of equal dimensions, one end of which is [illegible] to No 2. [illegible]; this piece
forms with No 2. an angle of 50 degrees, the other end extends diagonally towards the front
of the rear side of the carriage; in a line with the front of the [illegible] No a piece of plank
of the same width and thickness No 4. One end of this is [illegible] to the [illegible] end of
No 1. at a [illegible] angle with it, and the other is [illegible] to No 3. [illegible] to it.
[illegible] No 2. at the distance 1 foot [illegible] inches from No 1. is another piece of plank
of equal width and thickness extending from No 2. to No 4. and [illegible]
[illegible]. This piece No 5. supports the centre of the axle of the rear wheel by means of a